(12) United States Patent
Kienzle et al.

(10) Patent No.: US 7,940,207 B1
(45) Date of Patent: May 10, 2011

(54) MODULAR DESIGN FOR A FILL-LEVEL-RADAR ANTENNA SYSTEM

(75) Inventors: Klaus Kienzle, Zell a. H. (DE); Josef Fehrenbach, Haslach (DE); Juergen Motzer, Gengenbach (DE); Johannes Falk, St. Georgen (DE); Fritz Lenk, Schiltach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 12/547,926

(22) Filed: Aug. 26, 2009

Related U.S. Application Data

(60) Provisional application No. 61/096,947, filed on Sep. 15, 2008.

(30) Foreign Application Priority Data

Sep. 15, 2008 (EP) .................................. 08164367

(51) Int. Cl.
*G01S 13/08* (2006.01)
(52) U.S. Cl. ......... 342/124; 343/772; 343/774; 343/786
(58) Field of Classification Search .................. 342/124
See application file for complete search history.

(56) References Cited

U.S. PATENT DOCUMENTS

| | | | | |
|---|---|---|---|---|
| 2,408,055 | A | * | 9/1946 | Fiske ............................... 333/13 |
| 6,393,909 | B1 | * | 5/2002 | Fahrenbach et al. ........ 73/290 V |
| 6,417,748 | B1 | * | 7/2002 | Lopatin et al. ................ 333/252 |
| 2002/0163401 | A1 | * | 11/2002 | Zhang ........................... 333/135 |
| 2002/0176139 | A1 | * | 11/2002 | Slaughter et al. ............. 359/172 |
| 2003/0179148 | A1 | * | 9/2003 | Ohlsson ........................ 343/786 |
| 2003/0231679 | A1 | * | 12/2003 | Umemoto et al. .............. 372/43 |
| 2006/0017640 | A1 | | 1/2006 | Kienzle et al. |
| 2009/0212996 | A1 | * | 8/2009 | Chen et al. .................... 342/124 |

FOREIGN PATENT DOCUMENTS

| | | |
|---|---|---|
| EP | 0 859 427 | 8/1998 |
| EP | 0 871 241 | 10/1998 |
| EP | 1 619 747 | 1/2006 |
| EP | 0 922 942 | 6/2009 |
| WO | 2003/078936 | 9/2003 |
| WO | WO 2006120124 A1 * | 11/2006 |

* cited by examiner

*Primary Examiner* — Thomas H Tarcza
*Assistant Examiner* — Timothy A Brainard
(74) *Attorney, Agent, or Firm* — Fay Kaplun & Marcin, LLP

(57) ABSTRACT

A modular system is for assembling a fill-level radar antenna, a fill-level radar antenna, and o a fill level radar. The modular system comprises several modules that can be interconnected. In this way a host of different fill-level radar antennae may be produced that are optimally adapted to the corresponding conditions.

15 Claims, 4 Drawing Sheets

MODULAR DESIGN FOR A FILL-LEVEL-RADAR ANTENNA SYSTEM

REFERENCE TO RELATED APPLICATION

This application claims the benefit of the filing date of EP Patent Application Serial No. 08 164 367.8 filed 15 Sep. 2008 and U.S. Provisional Patent Application Ser. No. 61/096,947 filed on 15 Sep. 2008, the disclosure of which applications is hereby incorporated herein by reference.

FIELD OF THE INVENTION

The invention relates to fill level measuring. In particular, the invention relates to a modular system or kit of parts for assembling a fill-level radar antenna, to a fill-level radar antenna, and to a fill level radar.

BACKGROUND INFORMATION

Various measuring systems are used in the field of fill-level radar measuring, each measuring system being adapted to the corresponding measuring environment. Depending on the field of application, various frequencies of the transmission signals can be considered. Possible frequencies range to above 100 GHz. Depending on the external environment, the transmission frequency used, and the desired maximum widening of the transmission signal after it has left the antenna, a host of different antenna sizes and antenna shapes may be used.

For the end user this means that, depending on the specification desired, said end user may have to obtain a correspondingly fabricated antenna. If the requirements that the antenna has to meet change substantially, then a new antenna may have to be obtained.

SUMMARY OF THE INVENTION

Stated are a modular system, i.e. a kit of parts, for producing, i. e. assembling, a fill-level radar antenna, a fill-level radar antenna, and a fill level radar.

The exemplary embodiments described relate equally to the modular system, the fill level radar and the fill-level radar antenna. In other words, the characteristics which hereinafter have been mentioned in relation to the fill-level radar antenna can also be implemented in the modular system or in the fill level radar and vice versa.

According to an exemplary embodiment of the invention, a modular system, such as a kit of parts, for assembling a fill-level radar antenna is stated, which modular system comprises a first module and a second module. The first module is a base antenna horn that is filled with dielectric material and that is used for feeding a transmission signal to the second module. The second module is designed to radiate the transmission signal to a fill level surface, wherein the second module is an expansion horn, a parabolic antenna, a filled antenna horn, an antenna horn with a lens, an upright-tube antenna or a rod antenna.

With this modular system an antenna system for a fill level radar is stated in which a small, filled and compact antenna horn (base antenna horn) makes possible the coupling-in for various further antenna systems (the second modules), and at the same time also for itself, in other words without any expansion, for fill level measuring using radar. Hereinafter, this antenna horn is referred to as a "base horn", "base antenna horn" or "base horn antenna".

According to a further exemplary embodiment of the invention, the first module (base antenna horn) is designed for detachable connection to the second module.

In this way it may be possible for the second module to be exchanged in a simple manner when the fill-level radar antenna is, for example, to be used in some other measuring environment that, for example, requires different focusing of the transmit beam.

According to a further exemplary embodiment of the invention, the first module comprises a first thread and the second module comprises a counter-thread, which corresponds to the first thread, for producing the detachable connection.

In this way the two modules may be screwed together. At this location other types of connections are also possible. For example, the two modules can be connected by means of a flange connection. In this arrangement the two modules are, for example, connected with the use of four screws. A further option comprises a plug-type connection which then clicks into place in a manner that is known.

According to a further exemplary embodiment of the invention, the modular system further comprises a third module that is designed as a waveguide (a so-called feeder waveguide). The third module, too, can be connected to the first module by way of a detachable connection.

According to a further exemplary embodiment of the invention, the first module comprises a waveguide section by way of which the transmission signal is fed from the source, for example to an electronics module of the fill level radar.

According to a further exemplary embodiment of the invention, the waveguide and/or the waveguide section of the first module comprise/comprises a glass window whose thickness approximately corresponds to an integral multiple of half a wavelength of the transmission signal.

In this manner process separation relating to pressure may be provided (in other words an element that separates potentially explosive zones in potentially explosive regions).

In order to increase the bandwidth of the glass window, this may be coated on one side or on both sides with a dielectric of a low permittivity value. For example PTFE is suitable for this. In each case the coating comprises an approximate thickness of $\lambda/4$ of the material used. For example, with two PTFE discs of a thickness of $\lambda/4$ the bandwidth of the glass window almost doubles.

According to a further exemplary embodiment of the invention, the second module is designed as a Cassegrain antenna. This is, for example, a particular form of the parabolic antenna.

According to a further exemplary embodiment of the invention, the first module comprises a lens that is arranged between the first module and the second module.

According to a further exemplary embodiment of the invention, the lens is designed for coupling the transmission signal into the second module.

According to a further exemplary embodiment of the invention, the modular system is designed for frequencies of the transmission signal in the range of between 75 GHz and 110 GHz. Said modular system can also be designed for frequencies below 75 GHz or above 110 GHz.

According to a further exemplary embodiment of the invention, the transition between the first module and the second module, or the transition between the first module and the third module is designed so as to be gapless so that the second module commences directly on the antenna filling of the first module, or the third module directly continues from the first module.

According to a further exemplary embodiment of the invention, a fill-level radar antenna is stated that comprises a first module and a second module of a modular system described above and below.

According to a further exemplary embodiment of the invention, a fill level radar with a fill-level radar antenna is stated, which fill-level radar antenna comprises a first module and a second module of a modular system described above and below.

Below, exemplary embodiments of the invention are described with reference to the figures.

DETAILED DESCRIPTION OF EXEMPLARY EMBODIMENTS

Figure 1:
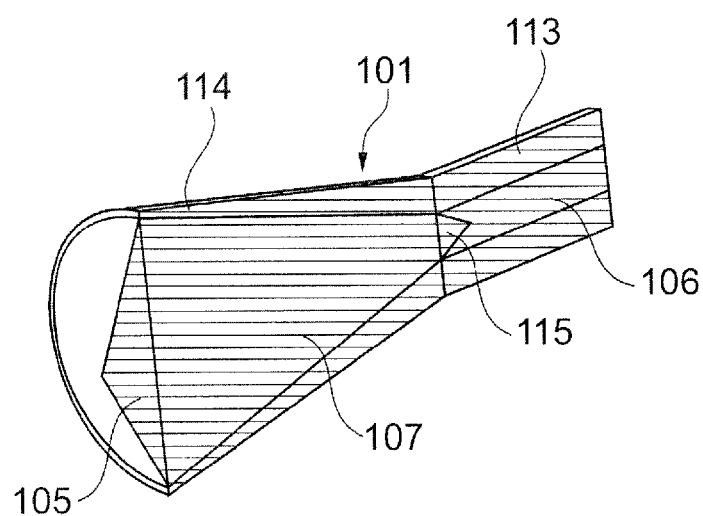
FIG. 1 shows a section view of a first module according to an exemplary embodiment of the invention.

The illustrations in the figures are diagrammatic and not to scale.

In the following description of the figures the same reference characters are used for identical or similar elements.

FIG. 1 shows a section view of a base antenna horn 101. The base antenna horn 101 comprises an antenna housing 113, 114. The region of the housing 114 is conical in shape so that it forms an antenna funnel that is at least partly filled with a dielectric material 107. The region 113 is cylindrical in shape so that it forms a waveguide section 106. A conically tapering tip 115 of the dielectric filling 107 projects into the waveguide section 106.

Furthermore, a lens 105 is provided, which also comprises dielectric material.

For example, the lens 105, the antenna filling 107 and the conical tip 115 may be formed in one piece.

Furthermore, these three elements 105, 107 and 115 may be joined and may be made from different materials.

The base horn 101 is the central element, in other words the base, of the modular system. It is designed in such a way that all the other antenna types or antenna expansions, which will be specified in more detail below, can be fed with it. In addition, said base horn on its own already, in other words even without any expansion in whatever form, may be used for fill level measuring. This provides an advantage in that, on the one hand, measuring can also take place in very small container openings, and, on the other hand, various expansions can be affixed depending on the requirements, applications and the available space.

For example, the fill-level radar antenna constructed from the individual modules is used in the W-band. The W-band ranges from 75 GHz to 110 GHz. In particular, the fill-level radar antenna can be used at a centre frequency of 79 GHz (bandwidth for example ±2 GHz or ±3 GHz). In this arrangement the base horn 101 can, for example, comprise an external diameter of 19.05 cm (7.5"), which then with a wall thickness of 0.5 mm of the antenna horn corresponds to an antenna aperture of approximately 18 mm.

It should be mentioned that the frequency of 79 GHz is also in the so-called E-band, which ranges from 60 GHz to 90 GHz, because these "standard bands" overlap.

If the antenna were not filled, the antenna horn 114 would have an optimum length of approximately 110 mm. By filling the antenna with a dielectric material (for example polytetrafluoroethylene (PTFE) or polypropylene (PP)) and a lens 105 put in place, which lens 105 is made of the same material, the horn length can be reduced to approximately one quarter, i.e. 25 to 30 mm. In this arrangement the lens can have any desired shape and can, in particular, also be made from some other dielectric material, as long as said lens operates as a convergent lens or a convex lens. For example, the lens is spherical, aspherical or it is a fresnel lens. Moreover, the lens can be conical. In particular by affixing the lens in a corresponding shape, improved droplet draining behaviour vis-à-vis condensate residues is achieved.

On the non-radiating end, the base horn 101 itself comprises a waveguide 106, 113 that may be filled or not filled. If the waveguide is not filled, the dielectric filling 107 of the antenna horn 114 can leak into the waveguide 106. This is shown by the tip 115. In a conical horn, for example, the dielectric filling may reach right up to the imaginary tip of the cone that is formed by the conical horn. The tip in the waveguide may, of course, also assume an angle that differs from the opening angle of the antenna funnel 114.

For example, the waveguide of the conical horn is designed as a round waveguide. However, the waveguide may also assume some other form, e.g. oval or rectangular. In this waveguide 106, 113 the microwave signals are coupled-in and/or coupled-out from the electronic- or high-frequency unit 805 (see FIG. 8).

Figure 5A:
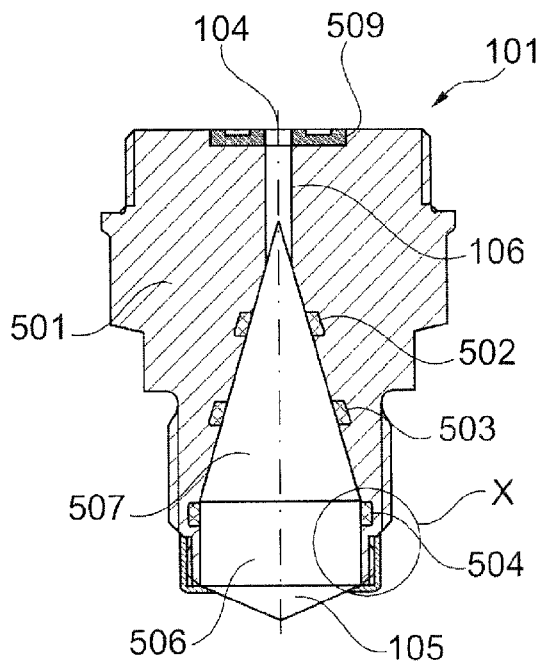
FIG. 5A shows a section view of a first module according to a further exemplary embodiment of the invention.

The waveguide 106, or a waveguide 103 following on from it, can comprise a glass window 104 (see for example FIG. 5A). This glass window is used as a zone-separating element. To ensure optimal function, the thickness of the glass window is lambda-half or a multiple thereof, wherein lambda equals the wavelength of the transmission signal (relative to the centre frequency of the system). The value lambda-half relates to the permittivity value of the glass that is used for the window, i.e. half the wavelength of the transmission signal within the glass window.

In order to increase the bandwidth, the glass window can be coated, on one side or on both sides, with a dielectric comprising a low permittivity value. For example PTFE is a suitable material for this. Installation can, for example, take place by bonding to the glass. To ensure optimal function the thickness of this dielectric should be lambda-quarter, wherein here again lambda equals the wavelength of the transmission signal relative to the centre frequency of the system. The value lambda-quarter also relates to the permittivity value of the material used for coating, i.e. it is a quarter of the wavelength of the transmission signal within the coating used for the glass window.

Figure 6:
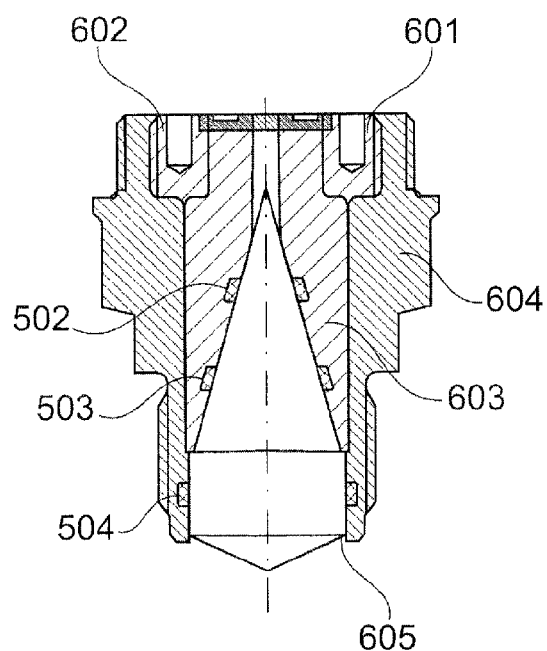
FIG. 6 shows a section view of a first module according to a further exemplary embodiment of the invention.
Figure 7B:
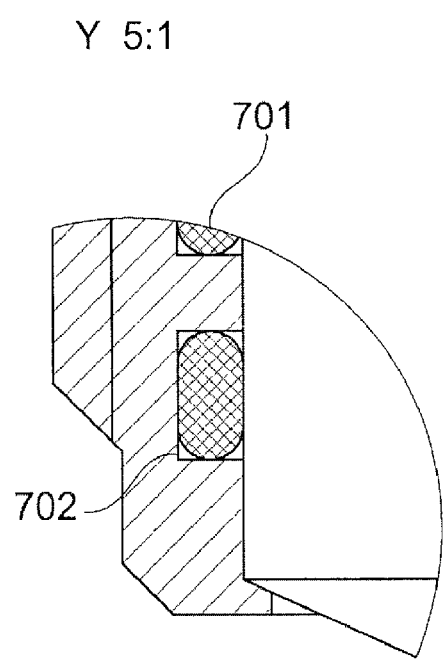
FIG. 7B shows an enlargement of a section of the module of FIG. 7A.
Figure 7A:
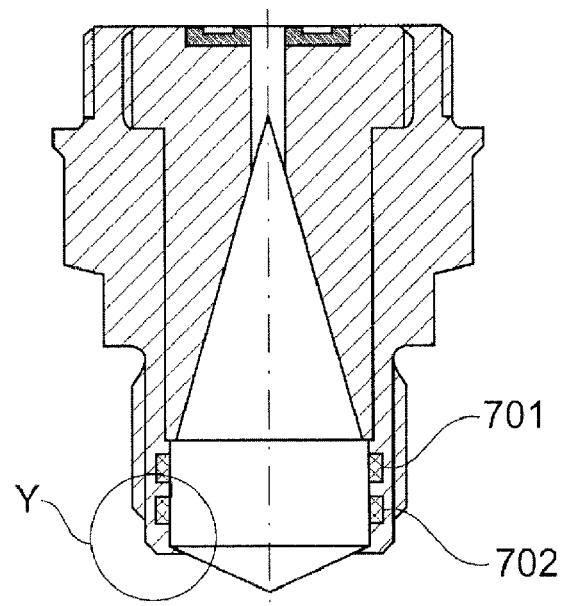
FIG. 7A shows a section view of a first module according to a further exemplary embodiment of the invention.

As shown in FIGS. 5A, 6, 7A, the glass window may have been installed at the top of the waveguide element 106. Attachment of the glass window to the waveguide 106 takes place, for example, by means of welding; but it may also be realized by means of a circumferential thread.

As has already been stated above, the base horn 101 may be used directly for measuring within the process. Furthermore, said base horn 101 may also be used for coupling-in with the use of other antennae. Below, various additional modular components are described which may be connected to the base antenna horn 101.

Figure 2:
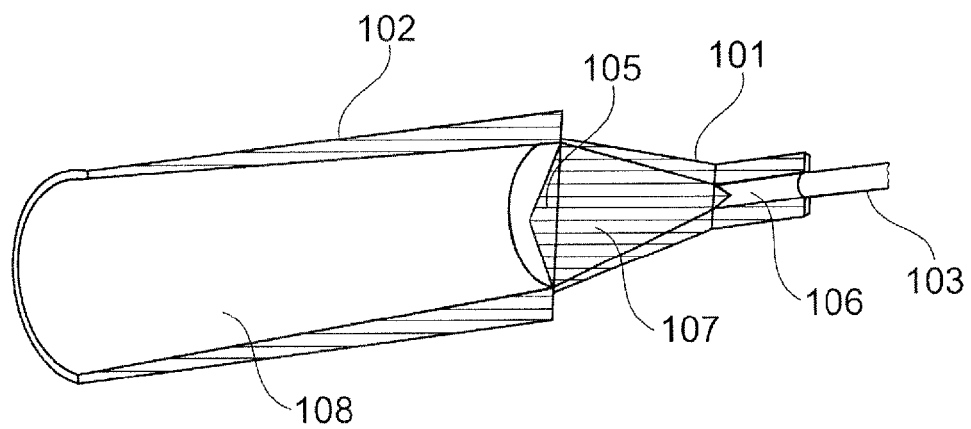
FIG. 2 shows a section view of a first module, of a second module and of a third module according to an exemplary embodiment of the invention.

FIG. 2 shows a section view of a base antenna horn 101 which on its front is connected to an expansion horn 102, and which, on its rear is connected to a waveguide 103.

Thus, the base horn 101 is used for coupling into the expansion horn 102. In this case the expansion horn 102 can be designed so as to be shorter when compared to an arrangement where widening to the expansion horn 102 were to take place directly from the waveguide 103 (i.e. if the expansion horn were connected directly to the waveguide 103).

The expansion horn 102 is conical in the interior 108. The interior 108 of the expansion horn 102 can be "empty" or it can be partly or fully filled with a dielectric material.

The waveguide 103 is, for example, screwed to the waveguide section 106 of the base horn 101 so that it can easily be disconnected.

Of course, the waveguide 106 of the base horn 101 may also be directly connected to the electronics of the fill level radar.

In the W-band, for example, the following dimensions may be considered:
An antenna horn with a diameter of 5.08 cm (2 inches) has an overall length of 425 mm including coupling into a waveguide with an interior diameter of 3.1 mm.
An expansion horn (module 2) with a diameter of 5.08 cm (2 inches) has an overall length of 270 mm including the base horn (module 1) with a diameter of 19 mm (0.75 inch).
This may result in shortening of the antenna to 64% of the original length.
An antenna horn with a diameter of 2.54 cm (1 inch) has an overall length of 150 mm including coupling into a waveguide with an interior diameter of 3.1 mm.
An expansion horn (module 2) with a diameter of 2.54 cm (1 inch) has an overall length of 115 mm including the base horn (module 1) with a diameter of 19 mm (0.75 inch).
This may result in shortening to 77% of the original length.

In particular in the case of large antenna there may be significant shortening in the antenna length, in each case with comparable electrical antenna ratings, such as antenna gain or 3 dB opening angle.

Figure 3:
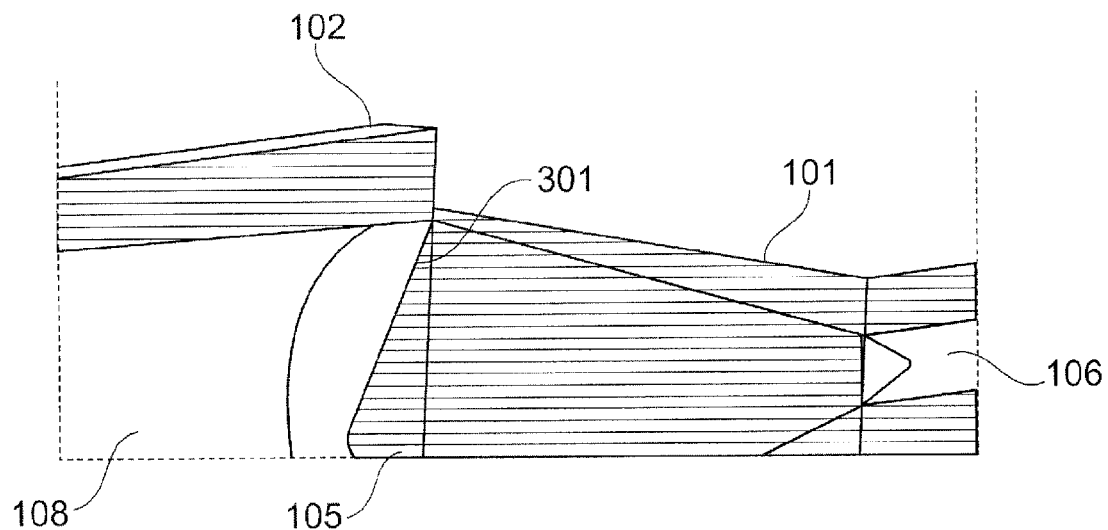
FIG. 3 shows an enlarged view of a region of the arrangement according to FIG. 2.

FIG. 3 shows an enlarged view of a partial section of the arrangement according to FIG. 2. The transition 301 between the base horn 101 and the expansion horn 102 is gapless, with the expansion horn 102 beginning directly at the end of the antenna filling or of the lens 105.

Other embodiments may also be possible, in which, for example, the diameter of the expansion horn is somewhat larger than the diameter of the filling of the base horn 101.

Attachment of the expansion horn 102 to the base horn 101 takes place, for example, by way of a thread. The expansion horn is then simply screwed onto the base horn.

However, other types of connections may also be possible at this position. For example the two modules may be connected to a flange connection. In this arrangement the two modules are, for example, connected with the use of four screws. A further option would be a plug-type connection that then clicks into place in some other manner.

Figure 4:
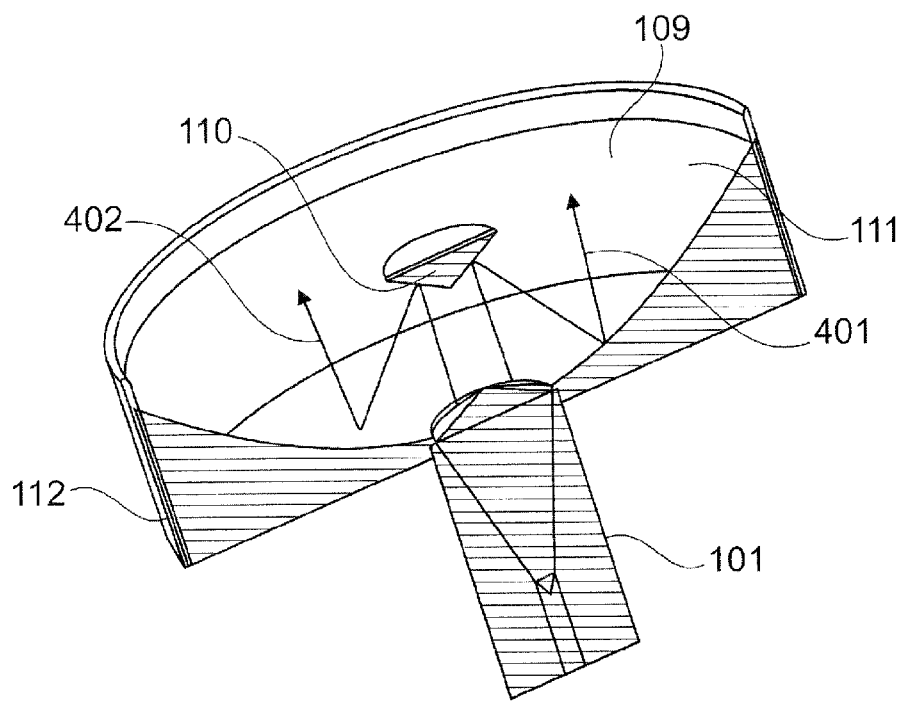
FIG. 4 shows a first module with a second module that is designed as a Cassegrain antenna.

FIG. 4 shows a further exemplary embodiment in which the base horn 101 is used for coupling into a parabolic Cassegrain antenna. The parabolic antenna 109 comprises a conical reflector 110, a parabolic mirror 111 and an antenna collar 112. The arrows 401, 402 symbolize the transmission signal.

The ratio between the focal length f and the diameter D (f/D ratio) of the parabolic mirror is, for example, 0.27 so that the sub-reflector 110 is situated within the mirror or within the mirror and its mirror edge 112. Such an arrangement is, for example, shown in EP 1619747 A1.

For example, the sub-reflector 110 is of hyperbolic shape. However, said sub-reflector 110 can also assume other shapes, for example a conical shape.

Attachment of the sub-reflector takes place, for example, with two or more webs that are attached within the parabolic mirror or at the edge of the mirror. Such attachment can, for example, take place by means of welding.

The transition from the horn antenna 101 to the parabolic mirror 109 takes place, for example, in a gapless manner.

Furthermore, the base horn 101 can be used for coupling into a further filled antenna horn. In this exemplary embodiment the so-called expansion horn 102 is also filled with one or several different dielectric materials. At the end of said expansion horn 102, again a lens is attached. In this arrangement the lens can have any desired shape, as long as it operates only as a convergent lens or a convex lens. For example it is spherical, aspherical or designed as a fresnel lens, or in a simplified manner it is simply conical in shape. As a result of the filling and of the lens, the antenna system can be still further shortened. At the same time the lens form may result in improved droplet draining behaviour vis-à-vis condensate residues.

Furthermore, the base horn may be used for coupling into a larger horn with a lens.

However, in this embodiment the so-called expansion horn remains unfilled. However, at its front end there is a convergent lens made of a dielectric material in order to shorten the antenna length. Possible lens shapes have been described above.

Likewise, the base horn may be used for coupling into an upright-tube antenna or a rod antenna.

Below, possible attachments of the antenna filling to the housing of the base antenna 101 are described.

FIG. 5A shows a section view of a base antenna 101 according to an exemplary embodiment of the invention. The antenna housing 501 is designed in a single piece. In this exemplary embodiment the filling 506, 507 of the antenna, together with the lens 105, has been pushed into the housing 501 from the front, with said filling 506, 507 and lens 105 being installed in said housing 501. The filling is attached and held by a mounting ring 508 that has been screwed on from the front. This mounting ring 508 is shown in detail in FIG. 5B.

The mounting ring 508 is, for example, installed by means of a thread. Furthermore, the mounting ring 508 can be made from a flexible material. In this case it can be clicked to the housing 501. Likewise, the mounting ring 508 can be bonded or welded to the housing.

Furthermore, several sealing rings 502, 503, 504 are provided, which are inserted into corresponding ring-shaped recesses 505 of the housing.

Apart from the lens 105, the dielectric filling of the antenna horn comprises two further regions 506, 507. The region 506 is cylindrical, while the region 507 is conical with its tip projecting into the waveguide section 106 of the base antenna 101. The cylindrical region 504 can also be done without completely so that the filling is only conical. In this case the seals are also arranged only in the conical region.

Furthermore, the glass window 104 is shown, which is fitted into a corresponding recess in a carrier plate 509. The carrier plate 509 is in a corresponding recess in the housing 501.

The filling 506, 507 with the lens 105 may be designed in one piece or in two or three pieces.

In particular in the case of a multipart design of the filling 506, 507, 105, the mounting ring 508 serves to press the individual parts together.

FIGS. 6 and 7A, 7B show two further exemplary embodiments of the base horn 101, in which the antenna filling is installed and screwed into place from the rear (i.e. from the face that points towards the electronics). The antenna filling is designed in one piece or in two pieces.

FIG. 6 or 7A, 7B show various options of installing the O-rings 502, 503, 504 or 701, 702. For example, two O-rings 502, 503 are arranged in the region of the conical section of the filling, whereas a third O-ring 504 is installed in the region of the cylindrical section of the filling (see FIG. 6). Furthermore, the O-rings 701, 702 can be arranged only in the cylindrical region of the filling (see FIGS. 7A, 7B).

Figure 5B:
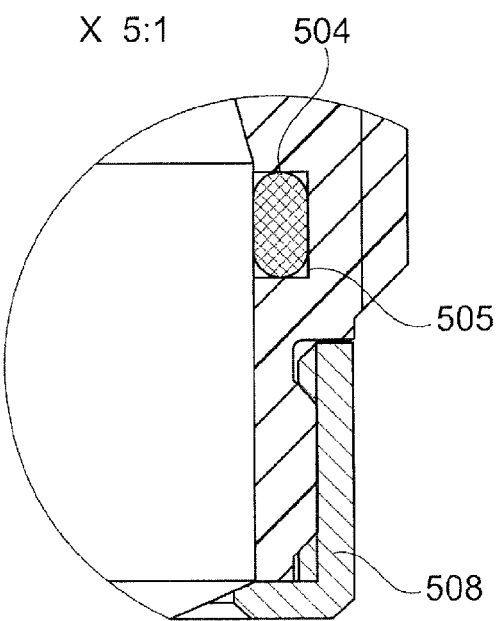
FIG. 5B shows an enlarged section of the module of FIG. 5A.

Furthermore, the recess for an O-ring, instead of being in the antenna horn, can also be partly or entirely in the filling. The term "recess" refers to a cut-in (groove) in which the O-ring is placed, as shown in FIG. 5B.

As shown in FIG. 6, in the front region of the housing 604 the filling is held by a circumferential projection 605. In the rear region the filling has been affixed by the ring 601, 602.

In this exemplary embodiment an element 603 is slid into the housing 604, which element 603 forms the actual antenna horn. In other words, in contrast to the embodiment of FIG. 5A, the housing in this embodiment comprises multiple parts. The element 603 comprises, for example, metal, preferably stainless steel or aluminium. It is also possible to use plastic, for example PBT (VALOX with glass fibre), which at least on the interior contour is metallized. The housing 604 also comprises metal, for example stainless steel.

FIG. 7B shows an enlarged detail of section Y of FIG. 7A. As is also the case in FIG. 5B, the magnification scale is 5:1.

A further option of attaching the filling consists of injecting a thermoplastic material, for example perfluoroalkoxypolymer (PFA). This then acts like a hot-melt-type adhesive. In this embodiment the system is also sealed off at the same time.

Likewise it may be possible to inject the filling completely, for example using PFA. With this embodiment, too, the system may be sealed off already without O-rings.

Figure 8:
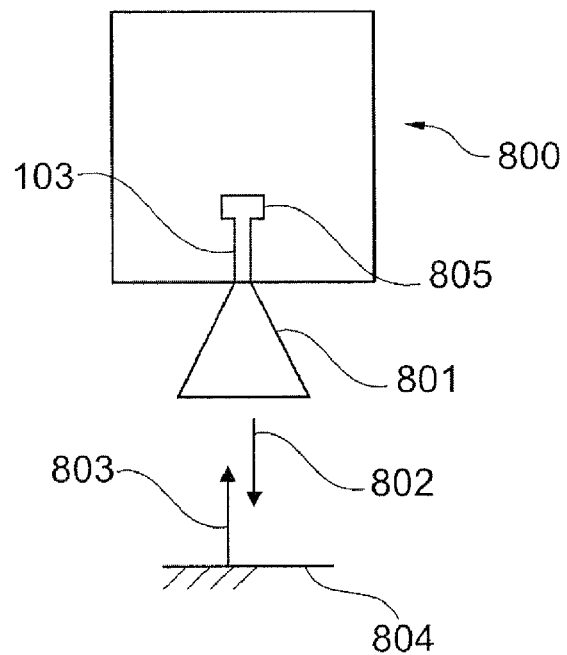
FIG. 8 shows a fill level radar according to an exemplary embodiment of the invention.

FIG. 8 shows a fill level radar 800 with a fill-level radar antenna 801 that comprises a first and second module as described above. Furthermore, a waveguide 103 is provided, which connects the antenna 801 to the electronics 805.

The antenna 801 sends a transmission signal 802 in the direction of the product surface 804, from which a corresponding return signal 803 is reflected and subsequently picked up by the antenna 801.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A modular system for assembling a fill-level radar antenna, comprising:
    a first module; and
    a second module;
    wherein the first module includes a housing and a base antenna horn that is filled with dielectric material and that feeds the second module with a transmission signal,
    wherein the second module radiates the transmission signal to a fill level surface,
    wherein the second module is selected from a group comprising an expansion horn, a parabolic antenna, a filled antenna horn, an antenna horn with a lens, an upright-tube antenna, and a rod antenna,
    wherein the housing has a rear portion and an opposite front portion which faces the second module and which comprises a mounting ring or a circumferential projection for holding the dielectric material,
    wherein the dielectric material is inserted into the housing from the rear portion, and
    wherein, after insertion of the dielectric material into the housing, the base antenna horn is inserted into the housing from the rear portion.

2. The modular system according to claim 1, wherein the first module is detachably connecting to the second module.

3. The modular system according to claim 2, wherein the first module includes a first thread and the second module includes a counter-thread which corresponds to the first thread, for assembling the detachable connection.

4. The modular system according to claim 2, wherein the detachable connection is a flange connection.

5. The modular system according to claim 1, further comprising:
    a third module being a waveguide,
    wherein the first module is detachably connecting to the third module.

6. The modular system according to claim 1, wherein the first module includes a waveguide section.

7. The modular system according to claim 5, wherein one of the waveguide and the waveguide section includes a glass window whose thickness corresponds to an integral multiple of half a wavelength of the transmission signal.

8. The modular system according to claim 7, wherein the glass window is coated on at least one side with a dielectric.

9. The modular system according to claim 1, wherein the second module is a Cassegrain antenna.

10. The modular system according to claim 1, wherein the first module includes a lens which is arranged between the first module and the second module.

11. The modular system according to claim 10, wherein the lens couples the transmission signal into the second module.

12. The modular system according to claim 1, wherein frequencies of the transmission signal is in a range of between 75 GHz and 110 GHz.

13. The modular system according to claim 1, wherein a transition between the first module and the second module is gapless so that the second module commences directly on the dielectric material of the first module.

14. A fill-level radar antenna, comprising:
    a modular system including a first module and a second module,
    wherein the first module includes a housing and a base antenna horn that is filled with dielectric material and that feeds the second module with a transmission signal, wherein the second module radiates the transmission signal to a fill level surface, wherein the second module is selected from a group comprising an expansion horn, a parabolic antenna, a filled antenna horn, an antenna horn with a lens, an upright-tube antenna, and a rod antenna, wherein the housing has a rear portion and an opposite front portion which faces the second module and which comprises a mounting ring or a circumferential projection for holding the dielectric material, wherein the dielectric material is inserted into the housing from the rear portion, and wherein, after insertion of the dielectric material into the housing, the base antenna horn is inserted into the housing from the rear portion.

15. A fill level radar, comprising:

a fill-level radar antenna including a first module and a second module, wherein the first module includes a housing and a base antenna horn that is filled with dielectric material and that feeds the second module with a transmission signal, wherein the second module radiates the transmission signal to a fill level surface, wherein the second module is selected from a group comprising an expansion horn, a parabolic antenna, a filled antenna horn, an antenna horn with a lens, an upright-tube antenna, and a rod antenna, wherein the housing has a rear portion and an opposite front portion which faces the second module and which comprises a mounting ring or a circumferential projection for holding the dielectric material, wherein the dielectric material is inserted into the housing from the rear portion, and wherein, after insertion of the dielectric material into the housing, the base antenna horn is inserted into the housing from the rear portion.

* * * * *